United States Patent [19]

Schaefer

[11] Patent Number: 4,791,494
[45] Date of Patent: Dec. 13, 1988

[54] MULTIPLE VARIABLE LIGHT SOURCE PRINTER

[75] Inventor: Louis F. Schaefer, Palo Alto, Calif.

[73] Assignee: Savin Corporation, Stamford, Conn.

[21] Appl. No.: 605,977

[22] Filed: Apr. 30, 1984

Related U.S. Application Data

[63] Continuation of Ser. No. 470,733, Mar. 7, 1983, abandoned, which is a continuation of Ser. No. 14,471, Feb. 23, 1979, abandoned.

[51] Int. Cl.⁴ .................. H04N 1/23; G03G 21/00
[52] U.S. Cl. .................................. 358/300; 355/1; 355/67
[58] Field of Search .............. 355/1, 3 R, 14 E, 67, 355/69, 70; 354/3, 5; 358/298, 300

[56] References Cited

U.S. PATENT DOCUMENTS

| | | | |
|---|---|---|---|
| 2,890,968 | 6/1959 | Giaimo | 355/4 X |
| 3,045,587 | 7/1962 | Schwertz | 355/3 R X |
| 3,824,604 | 7/1974 | Stein | 355/1 X |
| 3,825,335 | 7/1974 | Reynolds | 355/1 |
| 3,912,387 | 10/1975 | Brooke | 355/3 R |
| 3,952,311 | 4/1976 | Lapeyre | 354/5 |
| 3,967,893 | 7/1976 | Majewicz | 355/69 X |
| 3,977,778 | 8/1976 | Seko et al. | 355/3 R |
| 4,000,495 | 12/1976 | Pirtle | 354/5 X |
| 4,107,687 | 8/1978 | Pfeifer et al. | 354/5 X |
| 4,124,286 | 11/1978 | Barasch | 355/3 R |
| 4,167,324 | 9/1979 | Wu | 355/3 R |

Primary Examiner—Fred L. Braun
Attorney, Agent, or Firm—Shenier & O'Connor

[57] ABSTRACT

A photographic printer for producing a visible image of information received in the form of a plurality of discrete electrical signals in which the signals are applied respectively to a plurality of devices each of which acts as a source of light in response to an electrical signal and which devices are arranged in an array adjacent to a photosensitive surface to direct light thereon in response to said signals thus to produce an image of the information on the surface. It is preferred form the printer is an electrophotographic printer in which the photosensitive surface is a charged photoconductor so that light from the sources produces a latent electrostatic image which may be developed and transferred to plain paper, for example.

5 Claims, 1 Drawing Sheet

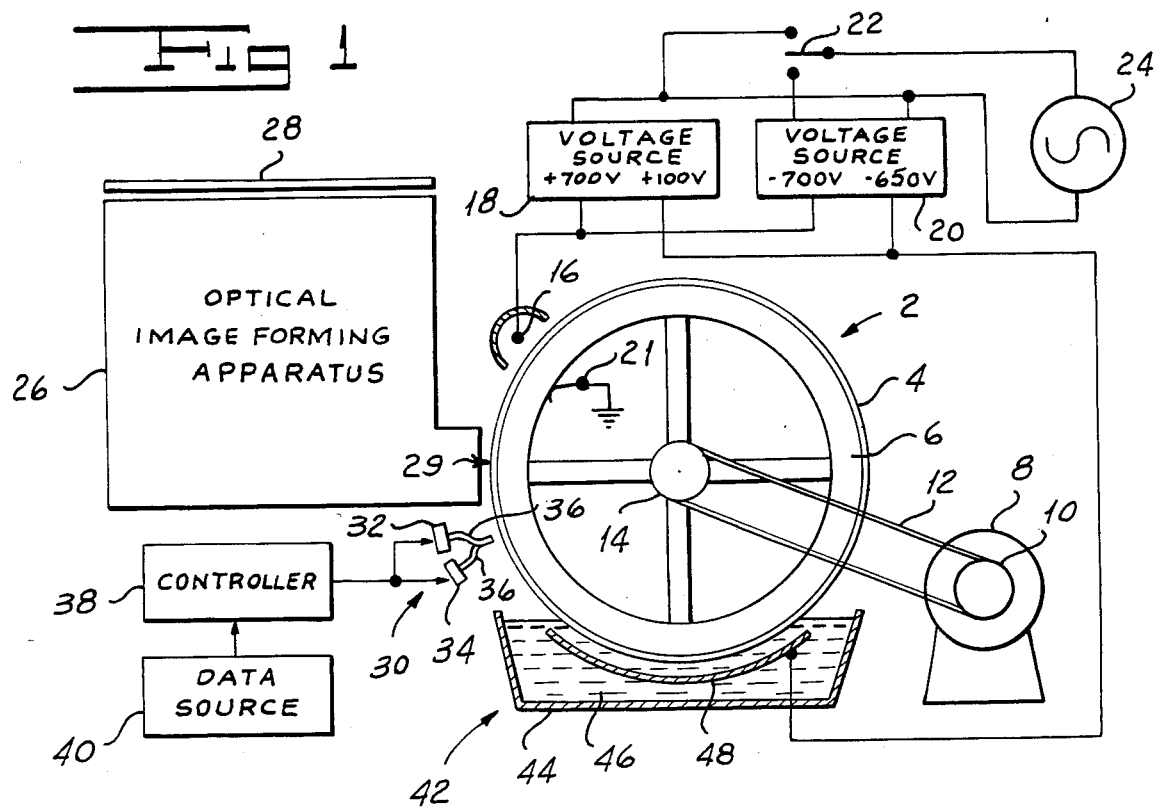
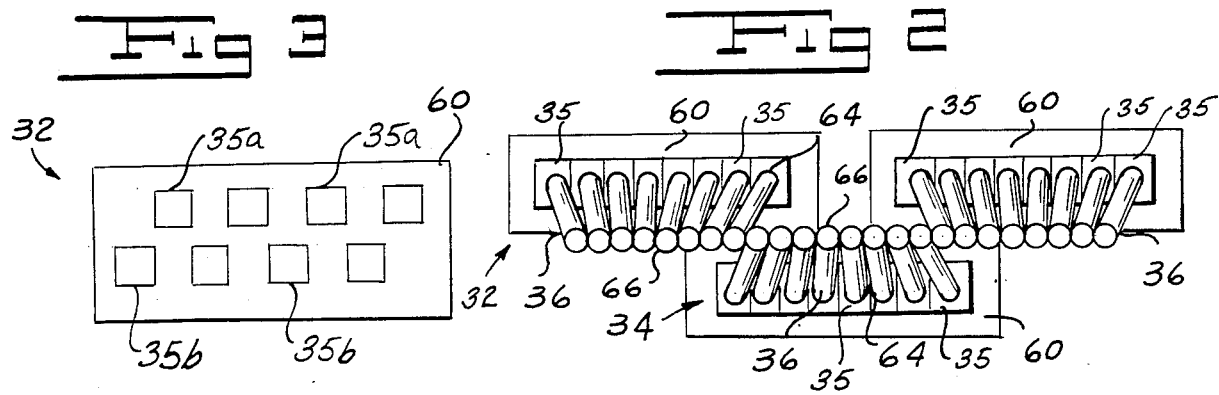
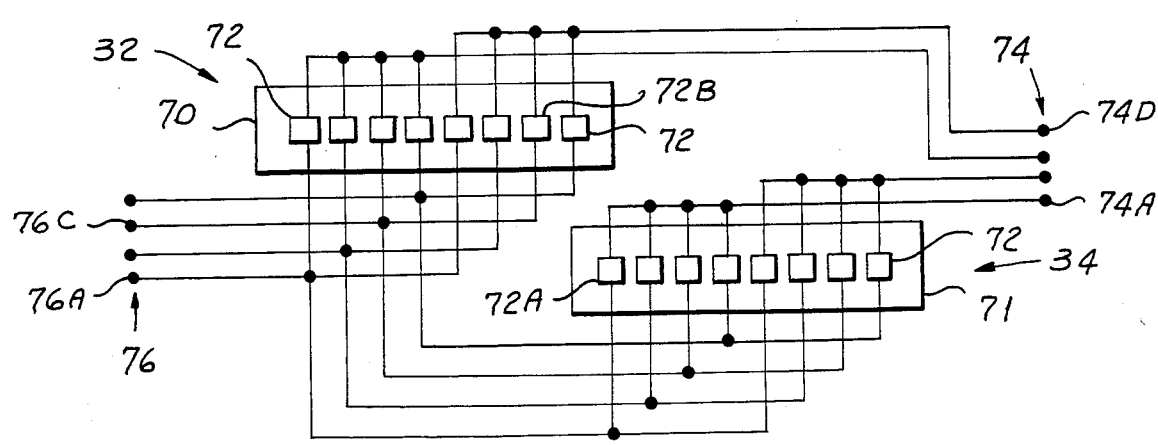

MULTIPLE VARIABLE LIGHT SOURCE PRINTER

This application is a continuation of my co-pending application Ser. No. 470,733, filed Mar. 7, 1983, now abandoned, which in turn is a continuation of application Ser. No. 014,471, filed Feb. 23, 1979, now abandoned.

BACKGROUND OF THE INVENTION

My invention relates to a photographic printer and more particularly to a photographic printer which responds to electrical signals encoding information to be printed.

Various types of photographic duplicating machines are known in the prior art. For example, there is known an electrophotographic copier incorporating a photoconductor on the surface of which a latent electrostatic is formed for subsequent development and possible transfer to a sheet of paper. These machines have the advantage of being fast in operation, of producing copies of good quality and of being relatively inexpensive for the result produced. It is desirable that the advantageous characteristics of these machines be employed in printing data which is encoded in the form of electrical signals. It would be particularly desirable if an apparatus could be designed which could function both as a traditional photocopier and also as a printer of electronic information.

Efforts have been made in the prior art to use printers with photosensitive surfaces to print electronically encoded information. A system embodying one such effort is disclosed in IBM Technical Disclosure Bulletin, Vol. 19, No. 7, December 1976. Light from a common light source is directed through a thin slit to a plurality of liquid crystal light beam modulators which are activated by electrical signals selectively to allow light to fall upon a plurality of respective small areas on the surface of a photoconductive drum to form a latent electrostatic image of the information represented by the electrical signals. One difficulty with this apparatus is its large size, which renders it unsuitable for use in a machine which is designed to operate both as a printer of electronic information and a conventional photocopier. More significantly the system requires a large light source, much of the light produced by which is not used. In addition the source generates excessive heat which results in a further waste of energy.

SUMMARY OF THE INVENTION

One object of my invention is to provide a photographic printer which responds to electrically encoded information.

Another object of my invention is to provide a photographic printer which responds both to information in electronic form and to information in optical form.

A further object of my invention is to provide a photographic printer which responds to electronically encoded information while minimizing the amount of waste light generated in the process of converting the electronically encoded information into light.

A still further object of my invention is to provide a photographic printer which responds to electronically encoded information and which is relatively small for the result produced thereby.

Yet another object of my invention is to provide a photographic printer which responds to electronically encoded information which requires very few moving parts.

Other and further objects of my invention will appear from the following description.

In general my invention contemplates a printer incorporating a plurality of light sources, each of which is responsive to a respective electrical signal to direct light onto a small portion of a photosensitive surface, to direct a pattern of light on the photosensitive surface in accordance with the information represented by the electrical signals. For example, a plurality of light emitting diodes (LEDs) may be arranged in a row across the photoconductive drum of a plain paper copier, perpendicular to the direction of motion of the drum's surface, and in response to signals applied to the LEDs, a latent image of the information represented by the signals would be produced on the drum surface. The latent images thus produced would be developed and transferred to a sheet of suitable copy material.

BRIEF DESCRIPTION OF THE DRAWINGS

In the accompanying drawings which form part of the instant specification and which are to be read in conjunction therewith and in which like reference numerals are used to indicate like parts in the various views.

FIG. 1 is a schematic view of the image forming and developing apparatus of an electrophotographic copying machine embodying my multiple variable light source printer.

FIG. 2 is an elevation of one array of LED chips and light pipes which may be used in my multiple variable light source printer.

FIG. 3 is an elevation of an LED component which may be used in my variable light source printer.

FIG. 4 is a schematic diagram of one form of electrical control circuit which can be used in my variable light source printer.

DESCRIPTION OF THE PREFERRED EMBODIMENT

Referring now to FIG. 1, a photoconductive drum, indicated generally by numeral 2, is coated with a thin layer 4 of photoconductive material which is applied to a conductive substrate 6. A motor 8 drives a sprocket wheel 10 to drive a chain 12, which drives a sprocket wheel 14, which drives drum 2 in a counterclockwise direction as viewed in FIG. 1.

The copying apparatus is provided with a charging corona 16 which is connected alternatively to one of two voltage sources, a positive development voltage source 18 or a negative development voltage source 20. Positive development voltage source 18 has a +700 volt output which may be connected to corona 16, while negative development voltage source 20 has a −700 volt output which may be connected to corona 16. Both of the voltage sources 18 and 20 are referenced to ground. A brush 21 engaging substrate 6 is grounded. A switch 22 is actuated alternatively to connect an alternating current power supply 24 to source 18 or source 20 to cause the corona 16 to apply a positive charge or a negative charge to the surface of photoconductive layer 4.

After the surface of photoconductor 4 has received a charge from the corona 16 it moves past an exposure system 26 of any suitable type known to the art which may expose the surface to a light image of a document 28, for example, at an exposure station, indicated generally by the reference character 29. After leaving the station 29, the surface of photoconductor 4 passes a second exposure station, indicated generally by the reference character 30, at which it may be exposed to a light pattern produced in response to incoming data in the form of electrical signals.

At station 30 I mount respective first and second rows, indicated generally by the reference characters 32 and 34, of light emitting diodes 35. It will readily be appreciated by those skilled in the art that the number of LEDs required to perform the task at hand is quite large, probably over 2000, based on 250 elements per inch and at least 8½ inches of paper width. Presently a single inexpensive array of LEDs 8½ inches long cannot be obtained. I have overcome this problem by the use of a multiplicity of component arrays. For example, as indicated in FIG. 2, row 32 may include a plurality of component arrays each of which includes eight active LED chip areas 35 carried by a support 60 for the active areas. Each of the chips 60, may for example, have a length of ¼ inch. In order to provide the effect of a continuous line of LEDs across the surface of drum 2, I space the chips 60 of each row 32 and 34 axially of the drum 2 and stagger the rows with respect to each other. The amount of staggering is such that the chips of one row "overlap" the chips of the other row by an axial distance which accounts for the inactive chip areas at the ends of the chips.

Owing to the circumferential spacing of the LEDs of one row with reference to LEDs of the other row, it would be necessary to delay the signals associated with the leading row with reference to the direction of movement of the drum 2 relative to the LEDs. I avoid this necessity by providing a plurality of light pipes 36 associated with the LEDs 35. I orient the light pipes 36 with first ends 64 thereof adjacent to the respective LEDs 35 of rows 32 and 34 and with the other ends 66 thereof adjacent to the drum surface in axially aligned relationship and are in close proximity to the drum surface.

In addition to the foregoing problem, it may not be possible to position the LED active areas 35 of a component array as close to each other on the supporting chips 60 as is indicated in FIG. 2. In this event I form the active areas of a component on a chip 60 as a pair of staggered rows of areas 35a and 35b as indicated in FIG. 3. In such case it may be necessary to delay the signals to one of the component rows. The problem could be obviated by the use of optical fiber light pipes.

I provide my apparatus with an electronic controller 38 which receives information from a data source 40 and converts the information into electrical impulses which are fed to the respective LEDs in properly timed sequence to produce a latent electrostatic image of the information on the surface of drum 2. Data source 40 might, for example, supply digital information such as is used by computers and word processing machines, or other forms of electronic information such as facsimile information.

Following the station 30 in the direction of rotation of drum 2 is developing apparatus, indicated generally by numeral 42. Apparatus 42 includes a developer tank 44 containing a liquid toner 46 having negative or positive toner particles, and a developer electrode 48 which is connected to the +100 volt output of voltage source 18 and the −650 volt output of voltage source 20, one or the other of which is active depending upon whether positive or negative development is used.

Alternative to the use of light pipes 36, it is possible to place LEDs directly adjacent to surface 4 of photoconductive drum 2. For example, as is shown in FIG. 4, a chip 70 containing a plurality of LEDs 72 could be placed in row 32 and a similar chip 71 could be placed in row 34. Rows 32 and 34 could each be placed sufficiently close to the surface of drum 2 so that the light from any given LED 72 would fall only upon a small portion of surface 4, and thus no optical fiber would be required to guide such light. It should be noted, however, that if, as is shown in FIG. 4, light from the various light emitting sources does not fall upon photoconductive surface 4 in a straight line perpendicular to its path of motion, controller 38 will have to delay the illumination of those light sources which are leading with respect to the path of motion relative to the illumination of those light sources which are trailing to produce the effect of aligned light sources.

The number of connections required to control the large number of LEDs necessary for creating high resolution printing may be reduced appreciably by the use of coincident addressing. I connect the lines 74A to 74D and 76A to 76D of two groups of lines 74 and 76, to the respective LEDs to form a matrix by virtue of which concomitant energization of only one line of each group will result in activation of one and only one LED 35. For example, if line 74A and line 76A are both energized, LED 72A will be activated. Similarly, if line 74D and line 76C are both energized, LED 72B will be activated.

In operation of the apparatus shown in FIG. 1, it is capable of operating as a traditional photocopier merely by using optical image forming apparatus 26 to make a positive image of document 28 upon surface 4 of drum 2 at optical exposure station 29. In conventional electrophotography, it is most common to use positive development. Positive development means that toner is applied to those portions of photoconductive surface 4 which, after having been charged with a voltage by corona 16, are not discharged by light. For example, during positive development switch 22 is positioned so as to supply power to positive development voltage source 18. As a result, corona 16 will apply approximately a +700 volt charge to the surface of photoconductive drum 2. As this surface rotates, it will pass optical exposure station 29. At this point, an optical image of a portion of document 28 is focused upon surface 4 of drum 2. Where this image contains light, photoconductive surface 4 will conduct electricity. This will cause charge deposited on surface 4 by corona 16 to be conducted to conductive substrate 6, reducing the charge on the illuminated portion of surface 4 to around +50 volts. Those portions of surface 4 upon which no light impinges, however, will not discharge to any appreciable extent. The resulting varied pattern of charge upon photoconductive surface 4 after it has passed optical exposure station 29 is a positive latent image of the light pattern to which the drum has been subjected. As drum 2 rotates, the positive latent image will pass through developer station 42. Here, negatively charged toner particles will be attracted to those portions of photoconductive surface 2 which have not been discharged, and thus which maintain a charge of approximately +700 volts. A developer electrode 48 will have a voltage of +100 volts applied to it by voltage source 18, preventing negative toner particles from being attracted to those portions of surface 4 which have been discharged by light to approximately +50 volts. As a result of the attraction of negatively charged toner particles to those portions of surface 4 upon which light is not shown, a pattern of toner will be deposited upon surface 4. This pattern of toner can be transferred to a piece of paper by means well-known in the art to produce an electrophotographic copy of document 28.

When the apparatus is operated as an electronic printer, the only change is that light emitting diodes in electronic exposure station 30 emit light so as to discharge photoconductive surface 4 rather than the optical image forming apparatus 26 being used to form a latent image. It is, however, possible to operate both optical image forming apparatus 26 and electronic exposure station 30 at the same time so as to print electronically derived information on top of optically derived information.

Light from LEDs 35 which shines on small portions of photoconductive surface 4 causes those portions to discharge in the same manner as light from optical image forming apparatus 26. Similarly, those portions of surface 4 upon which no light is directed by the light emitting diodes retain their charge and, when developed, attract toner, creating corresponding dark spots on any copy which was made from the developed latent image formed by such LEDs. By controlling the timing with which various LEDs are turned on and off as drum 2 rotates past them, it is possible to create upon surface 4 a latent image containing textural or graphic information. The timing at which various LEDs are turned on and off must be accurately coordinated with the rotation of drum 2, just as the timing with which an electron beam in a raster scanned television picture has to be accurately coordinated with the timing of that picture's scan rate. In a manner analogous to the manner in which controllers for video monitors convert digital information into a series of dots which represent alphanumeric characters upon a television screen, controller 38 converts digital information from source 40 into a series of properly timed dots created by electronic exposure station 30 upon the surface of photoconductive drum 2. Alternatively, data source 40 could supply controller 38 with facsimile information which conveys graphic information in terms of dots along scan lines. Such facsimile information could easily be converted by controller 38 into a corresponding pattern of timed LED illuminations along the line of dots which can be created by electronic exposure station 30.

Most documents contain a much greater light area than dark area. Therefore, in order to save electricity and prevent unnecessary light and heat near the site of the electrophotographic process, it may be desirable to produce negative laten images by electronic exposure station 30 and to negatively develop such images. In negative development, toner particles are attracted to those portions of the photoconductive surface 4 which have been illuminated by light, rather than to those portions which remain unilluminated. When operating in the negative development mode, switch 22 is positioned so as to connect power supply 24 to negative development voltage source 20. As a result, a charge of −700 volts is supplied to corona 16. A charge of approximately −700 volts is placed on the surface of photoconductive drum 2. As that charged surface passes electronic exposure station 30, those portions of it which are illuminated by LEDs will conduct electrons toward conductive substrate 6, thus losing much of their negative charge. As a result, those portions of surface 4 which are illuminated by LEDs will have their voltage reduced to approximately −50 volts, whereas those portions which have not been illuminated will remain at approximately −700 volts. As a result, a negative latent electrophotographic image will be produced on the surface of drum 2. As this latent image passes through developing station 42, negative toner particles will be attracted to those portions of the drum which have been discharged to approximately −50 volts. This is because development electrode 48 is supplied by voltage source 20 with a voltage of −650 volts, creating a field which causes negative toner particles to migrate toward those portions of photoconductive surface 4 which are charged with −50 volts and which causes those toner particles to be repelled from the portions of photoconductive surface 4 which still have a charge of approximately −700 volts. As a result, a distribution of toner will be placed upon photoconductive surface 4 which can be transferred to a piece of paper so as to make a copy by means well-known in the electrophotographic art.

It will be seen that I have accomplished the objects of my invention. I have provided a printer of electronic information which takes advantage of the high speed of many printing processes which use photosensitive surfaces. I have provided means of producing photocopiers which are able to print electronic information, as well as creating conventional photocopies. Furthermore, I have provided a means for converting electronic information into light information for the use of printing processes which use photosensitive surfaces, which means do not waste light energy and space and which do not have many moving parts.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An electrophotographic printer including in combination a photoconductive member, means for charging said member, an array of light emitting diodes optically coupled to respective regions of the charged member, and means for independently exciting said diodes to form a latent electrostatic image on the member, said exciting means including a first group comprising a first number F of conductors, a second group comprising a second number S of conductors, the product FS of the first and second numbers being equal to the number of diodes in the array, means connecting each conductor of the first group to one terminal of S diodes, and means connecting each conductor of the second group to the other terminal of F diodes, the connections being such that concomitant energization of one conductor of the first group and one conductor of the second group excites one diode in the array.

2. An electrophotgraphic printer including in combination a photoconductive member, means for charging said member, means for moving the member along a path, means comprising an array of independently excitable light emitting diodes optically coupled to respective regions of the charged member for forming thereon a latent electrostatic image, said array comprising two rows each extending perpendicular to the path of movement, the rows being spaced along the path of movement, each row comprising widely spaced groups of intimately spaced diodes, the groups of one row being staggered relative to the groups of the other row, a plurality of light conducting fibers each having a first end optically coupled to a corresponding diode and a second end disposed in proximity to the photoconductive member, said second ends being disposed along a line perpendicular to the path of movement and intermediate the two rows, said second ends comprising spaced groups of substantially contiguous fibers associated with one row alternating with spaced groups of substantially contiguous fibers associated with the other row.

3. An electrophotographic printer including in combination a photoconductive member, means for charging said member, means for moving said member along a path, and means comprising an array of independently excitable light-emitting diodes optically coupled to respective regions of the charged member for forming thereon a latent electrostatic image, said array comprising two rows each extending perpendicular to the path of movement, the rows being spaced along the path of movement, each row comprising two groups of intimately spaced diodes, the groups of each row being spaced apart to define a region free of diodes having an extent appreciably greater than the spacing between adjacent diodes in a group, the groups of one row being staggered relative to the groups of the other row, each group of diodes being disposed on a corresponding discrete elongated chip having an inactive chip area at each end, and the diode-free region of each row including two inactive chip areas.

4. An electrophotographic machine selectively operable either as a copier or as a printer including in combination a photoconductive member, means selectively operable in a copier mode to charge the member with one polarity of charge and to expose the charged member to an optical image of light and shade to form thereon a first positive latent electrostatic image and to develop said first image positively with a developer comprising charged toner particles, and means selectively operable in a printer mode to charge the member with the opposite polarity of charge and to form a second negative latent electrostatic image on the charged member and to develop said second image negatively with said developer, said second image forming means comprising an array of independently excitable light sources optically coupled to respective regions of the charged member to discharge the same, said charged toner particles each bearing said opposite polarity of charge.

5. Apparatus as in claim 4, further including means for moving the photoconductive member along a path, wherein the light sources comprise light emitting diodes, the array comprising two rows each extending perpendicular to the path of movement, the rows being spaced along the path of movement, each row comprising two groups of intimately spaced diodes, the groups of each row being spaced apart to define a region free of diodes having an extent appreciably greater than the spacing between adjacent diodes in a group, and the groups of one row being staggered relative to the groups of the other row.

* * * * *